Patented Oct. 18, 1927.

1,646,235

UNITED STATES PATENT OFFICE.

JOYCE H. CROWELL, OF BUFFALO, NEW YORK, ASSIGNOR TO NATIONAL ANILINE & CHEMICAL CO., INC., OF NEW YORK, N. Y., A CORPORATION OF NEW YORK.

PROCESS OF MAKING HALOGEN DERIVATIVES OF AROMATIC ORGANIC COMPOUNDS.

No Drawing.   Application filed September 26, 1924.   Serial No. 740,052.

This invention relates to the production of halogen derivatives of aromatic organic compounds. It relates more especially to improvements in the process of halogenating anthraquinone vat dyestuffs, and particularly those of the benzanthrone series.

It is well-known that vat dyestuffs of the anthraquinone series can be halogenated by subjecting them to the action of chlorine or of bromine, or of sulfuryl chloride, in the presence of indifferent organic solvents or diluents.

I have now found that aromatic organic compounds, particularly anthraquinone vat dyestuffs and especially those of the benzanthrone series, can be halogenated by treating them with chlorine or with bromine in the presence of sulfur dioxide and of a suitable organic solvent or diluent. I have found that the presence of sulfur dioxide is advantageous in that either it promotes the reaction or it causes the production of halogenated products having desirable physical characteristics, or both.

In carrying out the present invention, the organic compound or dyestuff is preferably dissolved or suspended in a suitable organic solvent or diluent, and the solution or suspension subsequently treated with sulfur dioxide and with chlorine or with bromine.

The following examples will further illustrate the invention, but it is understood that the invention is not limited thereto. The parts are by weight.

Example 1: Suspend 10 parts of finely divided isoviolanthrone (known commercially as indanthrene violet R) in 100 parts of nitrobenzene, and into the well-stirred suspension at ordinary temperature pass a current of sulfur dioxide until about 7 to 9 parts of it are absorbed. Then slowly pass a current of chlorine into the vigorously stirred mixture until about 8 to 11 parts are absorbed, not allowing the temperature to rise above about 35°–40° C. During this operation hydrogen chloride is evolved and the solution or mixture assumes a green color. Heat the chlorinated mixture or suspension to about 80° C., and maintain this temperature until the evolution of hydrogen chloride ceases. Then filter off the coloring matter, wash it with nitrobenzene, then with benzene, and finally with hot water, after which it may be dried or converted to a paste in any suitable manner.

The product thus obtained possesses the same general characteristics as to its dyeing properties as products obtainable by heretofore known processes. In its physical characteristics, however, it more closely resembles the chlorinated products obtainable by the chlorination of isoviolanthrone by means of sulfuryl chloride in the presence of nitrobenzene than it does those obtainable by means of chlorine alone in the same solvent, the product being granular or crystalline in structure, easily filtered and readily washed.

Example 2: Dissolve 2 parts of sulfur dioxide in 10 parts of nitrobenzene at ordinary temperature and to the well-stirred solution add 10 parts of finely divided indanthrene. Stir the mixture for 20 to 30 minutes and then add 10 parts of bromine and continue the agitation for 4 to 5 hours, not allowing the temperature to rise above about 60° C. Finally heat the mixture to about 80° C. and maintain this temperature until the evolution of hydrogen bromide ceases. Then filter off the product, wash it with nitrobenzene and then with alcohol and finally with water. The product thus obtained can be reduced to the dihydroazine form by vatting with hydrosulfite and reoxidizing in the usual well-known manner. The percentage of bromine present in the coloring matter thus obtained is higher than that ordinarily obtained in a product produced under the same conditions by the bromination of indanthrene by means of bromine in the absence of sulfur dioxide. If, in this example, 5 parts of sulfur dioxide are used in place of 2 parts, similar results are obtained.

In a similar manner, other aromatic organic compounds, for example, other anthraquinone vat coloring matters such as cyanthrene, pyranthrone, anthraquinone —1.2— acridone, dibenzanthrone, etc., can be treated with sulfur dioxide and halogen. Also, indigo, thioindigo, benzanthrone, etc., may be similarly treated.

Further, the invention is applicable to the production of bromchlor-derivatives, for example, for the production of bromchlorindanthrene, by first partially chlorinating with chlorine and then brominating with bromine, and one or both of the halogenating steps may be brought about in the presence of sulfur dioxide and a suitable solvent or diluent. The quantity of halogen employed can be varied and in this way, for instance, compounds or coloring matters containing a lesser or a greater proportion of halogen may be obtainable.

Instead of performing the halogenation in the presence of nitrobenzene it may be effected in the presence of other suitable organic solvents or diluents, for example, carbon tetrachloride, etc. Also, the amount of sulfur dioxide employed can be varied, and it may be introduced in any suitable order or manner. Pressures greater than atmospheric may also be employed.

I claim:

1. The process of producing a halogen derivative of an aromatic organic compound which comprises subjecting the organic compound to the action of halogen other than iodine and fluorine in conjunction with sulfur dioxide and a suitable organic solvent.

2. The process of halogenating a vat coloring matter of the anthraquinone series which comprises inducing a reaction between a vat coloring matter of the anthraquinone series and halogen other than iodine and fluorine in the presence of sulfur dioxide and of a suitable organic solvent.

3. The process of chlorinating a vat coloring matter of the anthraquinone series which comprises subjecting a vat coloring matter of the anthraquinone series to the action of chlorine in the presence of sulfur dioxide and of a suitable organic solvent.

4. The process of halogenating a vat coloring matter of the anthraquinone series which comprises subjecting a benzanthrone coloring matter to the action of halogen other than iodine and fluorine in the presence of sulfur dioxide and of a suitable organic solvent.

5. The process of chlorinating a vat coloring matter of the anthraquinone series which comprises subjecting a benzanthrone coloring matter to the action of chlorine in the presence of sulfur dioxide and of a suitable organic solvent.

6. The process of chlorinating isoviolanthrone which comprises inducing a reaction between isoviolanthrone and chlorine in the presence of sulfur dioxide and of a suitable organic solvent.

7. The process of chlorinating isoviolanthrone which comprises subjecting isoviolanthrone to the action of chlorine in the presence of sulfur dioxide and of nitrobenzene.

8. The process of halogenating an organic compound which comprises subjecting the organic compound to the action of halogen other than iodine and fluorine in the presence of a suitable organic solvent and of sulfur dioxide at a pressure greater than atmospheric pressure.

In testimony whereof I affix my signature.

JOYCE H. CROWELL.